United States Patent
Certain

(10) Patent No.: US 9,353,642 B2
(45) Date of Patent: May 31, 2016

(54) ROTARY WING AIRCRAFT HAVING TWO MAIN ENGINES TOGETHER WITH A LESS POWERFUL SECONDARY ENGINE, AND A CORRESPONDING METHOD

(71) Applicant: AIRBUS HELICOPTERS, Marignane (FR)

(72) Inventor: Bernard Certain, Aix en Provence (FR)

(73) Assignee: Airbus Helicopters, Marignane (FR)

( * ) Notice: Subject to any disclaimer, the term of this patent is extended or adjusted under 35 U.S.C. 154(b) by 136 days.

(21) Appl. No.: 14/085,034

(22) Filed: Nov. 20, 2013

(65) Prior Publication Data

US 2015/0125258 A1 May 7, 2015

(30) Foreign Application Priority Data

Nov. 26, 2012 (FR) ..................... 12 03183

(51) Int. Cl.
| | |
|---|---|
| *B64D 35/00* | (2006.01) |
| *F01D 13/00* | (2006.01) |
| *B64C 27/12* | (2006.01) |
| *F01D 15/12* | (2006.01) |
| *B64D 35/08* | (2006.01) |

(52) U.S. Cl.
CPC ............. *F01D 13/003* (2013.01); *B64C 27/12* (2013.01); *B64D 35/08* (2013.01); *F01D 15/12* (2013.01)

(58) Field of Classification Search
None
See application file for complete search history.

(56) References Cited

U.S. PATENT DOCUMENTS

| | | | | |
|---|---|---|---|---|
| 2,961,052 | A |   | 11/1960 | Smith et al. |
| 3,002,710 | A | * | 10/1961 | Marchetti et al. ......... 244/17.17 |
| 3,255,825 | A | * | 6/1966 | Mouille et al. ............ 416/170 R |
| 3,963,372 | A | * | 6/1976 | McLain et al. ................ 416/30 |
| 4,177,693 | A | * | 12/1979 | Ivanko et al. ................... 74/661 |
| 4,380,725 | A | * | 4/1983 | Sherman ....................... 320/150 |
| 4,479,619 | A | * | 10/1984 | Saunders et al. ............... 244/60 |
| 4,489,625 | A | * | 12/1984 | White ......................... 74/665 C |
| 6,098,921 | A | * | 8/2000 | Piasecki ..................... 244/17.19 |

(Continued)

FOREIGN PATENT DOCUMENTS

| | | |
|---|---|---|
| EP | 0091744 A1 | 10/1983 |
| EP | 1175337 B1 | 2/2005 |

(Continued)

OTHER PUBLICATIONS

Korean Office Action KR 10-2013-0144907 dated Feb. 10, 2015, 2 pages, English Translation.

(Continued)

*Primary Examiner* — Medhat Badawi
(74) *Attorney, Agent, or Firm* — Brooks Kushman P.C.

(57) ABSTRACT

An aircraft (1) having a rotary wing (2) and turboshaft engines (11, 12, 13) for driving said rotary wing (2). The aircraft then includes two main engines (11, 12) that are identical, each capable of operating at at least one specific rating associated with a main power (maxTOP, OEIcont), and a secondary engine (13) capable of operating at at least one specific rating by delivering secondary power (maxTOP', OEIcont') proportional to the corresponding main power (maxTOP, OEIcont) in application of a coefficient of proportionality (k) less than or equal to 0.5, said aircraft having a control system (20) for driving the rotary wing by causing each main engine (11, 12) to operate continuously throughout a flight, and by using the secondary engine (13) as a supplement during at least one predetermined specific stage of flight.

18 Claims, 1 Drawing Sheet

(56) References Cited

U.S. PATENT DOCUMENTS

| | | | |
|---|---|---|---|
| 8,283,796 B2* | 10/2012 | Certain | 290/31 |
| 2007/0257558 A1* | 11/2007 | Berenger | 307/10.1 |
| 2009/0105891 A1* | 4/2009 | Jones et al. | 701/2 |
| 2009/0140095 A1* | 6/2009 | Sirohi et al. | 244/17.19 |
| 2009/0145998 A1* | 6/2009 | Salyer | 244/17.23 |
| 2009/0171518 A1* | 7/2009 | Yamane | 701/15 |
| 2009/0186320 A1* | 7/2009 | Rucci et al. | 434/33 |
| 2010/0013223 A1* | 1/2010 | Certain | 290/31 |
| 2012/0006151 A1* | 1/2012 | DeDe et al. | 74/606 R |
| 2012/0018569 A1* | 1/2012 | Toni et al. | 244/17.11 |
| 2012/0025032 A1* | 2/2012 | Hopdjanian et al. | 244/53 R |
| 2013/0173090 A1* | 7/2013 | Rieunier et al. | 701/3 |
| 2013/0219905 A1* | 8/2013 | Marconi et al. | 60/772 |

FOREIGN PATENT DOCUMENTS

| | | |
|---|---|---|
| EP | 2148066 | 1/2010 |
| FR | 2962404 | 1/2012 |
| WO | 0068075 | 11/2000 |
| WO | 2012059671 | 5/2012 |

OTHER PUBLICATIONS

Search Report for FR 1203183, Completed by the French Patent Office on Jun. 21, 2013, 7 Pages.

Chinese First Office Action Dated Sep. 2, 2015, Application No. 201310610829.9, Applicant Airbus Helicopters, 12 Pages.

* cited by examiner

ROTARY WING AIRCRAFT HAVING TWO MAIN ENGINES TOGETHER WITH A LESS POWERFUL SECONDARY ENGINE, AND A CORRESPONDING METHOD

CROSS REFERENCE TO RELATED APPLICATION

This application claims priority to French patent application No. FR 12 03183 filed on Nov. 26, 2012, the disclosure of which is incorporated in its entirety by reference herein.

BACKGROUND OF THE INVENTION (1) Field of the Invention

The present invention relates to a rotary wing aircraft having two main engines together with a secondary engine that is less powerful, and the invention also relates to a method of controlling the aircraft.

The term "turboshaft engine" is used to mean a power unit contributing to the propulsion and/or lift of an aircraft. On an aircraft having a rotary wing, the term "turboshaft engine" is used to designate a power unit that drives rotation of a main gearbox "MGB" that in turn drives rotation of at least one rotor of the rotary wing.

(2) Description of Related Art

An aircraft is sometimes fitted with an auxiliary power unit (APU). The auxiliary power unit may for example be used for generating electricity, or for driving hydraulic systems. However, the auxiliary power unit does not drive a rotor main gearbox on a rotary wing aircraft.

Consequently, the auxiliary power unit of an aircraft does not constitute a "turboshaft engine" in the meaning of the invention.

This invention thus comes within the field of power plants for rotary wing aircraft, such as helicopters, for example.

The present invention relates more particularly to turboshaft engines, and the characteristics of such engines vary as a function of how they are sized or "dimensioned".

Thus, the Applicant has observed that the specific weight of a turboshaft engine depends on the power that it can deliver. The more powerful the turboshaft engine, the lower its specific weight. It should be recalled that the specific weight of an engine developing a given level of power corresponds to the weight of the engine divided by said given power.

Likewise, the specific fuel consumption of a turboshaft engine depends on the power that the turboshaft engine can deliver. It is also observed that the greater the power of a turboshaft engine, the lower its specific fuel consumption.

Under such circumstances, in terms of fuel consumption, it would appear that installing a very powerful turboshaft engine is more profitable than installing a less powerful turboshaft engine.

Nevertheless, the specific consumption of a given turboshaft engine also varies as a function of the power it delivers. Consequently, a turboshaft engine presents specific consumption that is optimized when the turboshaft engine is developing the maximum power authorized for that turboshaft engine. Specifically, when the power it develops becomes lower, the specific consumption of the engine increases.

It can be seen from the above observations that it can be difficult to dimension a turboshaft engine.

On a rotary wing aircraft, the manufacturer determines the maximum power that a turboshaft engine must deliver in order to guarantee the required performance for the aircraft. Under such circumstances, the turboshaft engine is dimensioned to deliver that maximum power.

When it is found that the power from a single turboshaft engine is not sufficient, manufacturers naturally install a plurality of turboshaft engines on their aircraft. As a result, heavy aircraft have a plurality of turboshaft engines.

It can thus be advantageous to have multi-engined aircraft. Nevertheless, the use of such multi-engined aircraft raises the problem of safety in flight in the event of an engine failing.

In particular, three configurations are used on rotary wing aircraft.

In a first configuration, the aircraft has two identical turboshaft engines that are too powerful.

Turboshaft engines are said to be "identical" when they have identical characteristics for driving a rotary member, and in particular when they are turboshaft engines having theoretical maximum powers that are equal.

Conversely, engines are said to be "unequal" when they have distinct drive characteristics, i.e. engines that generate different maximum powers.

In the first configuration, both of the engines are overdimensioned so as to ensure safe flight in the event of the other turboshaft engine failing.

Each turboshaft engine may then operate at a "standard rating" during cruising flight. The standard rating is sometimes referred to herein as the maximum continuous power (MCP) rating and the maximum continuous power rating is associated with unlimited duration of use.

Each engine may also operate at specific ratings that are used during specific stages of flight.

Thus, manufacturers have provided a rating that is referred to for convenience as the "normal specific rating". This normal specific rating is often referred to as the "takeoff rating" because it is used during a specific stage of flight for takeoff. In a twin-engined aircraft, the normal specific rating is also used during a specific stage of flight close to hovering.

The normal specific rating associates a maximum takeoff power maxTOP with a restricted duration of use. The maximum takeoff power maxTOP is greater than the maximum continuous power MCP.

Under such circumstances, the following contingency specific ratings are used on twin-engined aircraft when one of the turboshaft engines fails:

a first contingency specific rating associating a supercontingency power with a duration of about thirty consecutive seconds, referred to as a 30" OEI (for one engine inoperative);

a second contingency specific rating associating a maximum contingency power with a duration of use of the order of two minutes, referred to as 2' OEI; and a third contingency specific rating associating an intermediate contingency power with a duration of use extending to the end of a flight after an engine has failed, for example, and referred to as OEIcont.

The powers developed while using contingency specific ratings are greater than the power developed while using the standard rating.

It is thus conventional for each turboshaft engine to be dimensioned as a function of its highest contingency power, i.e. above the 30" OEI rating. In application of the above-mentioned principles, the specific consumption of turboshaft engines while they are using the maximum continuous power MCP is thus not optimized, since the maximum continuous power MCP is very different from the maximum power that the engine can deliver.

In a second configuration, the aircraft is fitted with two identical turboshaft engines, with the use of an "impasse time" ("temps d'impasse" in French language).

On the basis of experience, it is possible to envisage ignoring the risk of failure during certain stages of flight. Under such circumstances, the turboshaft engine may be dimensioned to deliver lower levels of contingency power than would be necessary in the first configuration. The weight of the engine is then reduced, but that has the consequence of reducing its maximum continuous power MCP.

However, this second configuration can require pilots to be trained so as to minimize the durations of stages of flight in which no provision has been made for a turboshaft engine failure.

In a third configuration, the aircraft has three identical turboshaft engines. In the event of one turboshaft engine failing, the other two remain in operation to ensure flight safety.

On a given aircraft, a three-engined power plant requires turboshaft engines that are less powerful than a twin-engine power plant.

However, the use of turboshaft engines that are less powerful compared with a twin-engined aircraft is not fully optimized. It should be recalled that in terms of fuel consumption, an arrangement with a very powerful turboshaft engine is less expensive than an arrangement with a less powerful turboshaft engine.

The dimensioning of the power plant of an aircraft is thus complex, independently of the configuration that is selected.

The technological background includes document U.S. Pat. No. 4,479,619, which proposes a power transmission system for three-engine helicopters.

That solution also proposes the alternative of declutching one of the three engines.

The Applicant's Super-Frelon helicopter also had three identical engines (without clutches).

Document U.S. Pat. No. 3,963,372 proposes a power-management and engine-control technique for three-engine helicopters.

In order to mitigate the problems associated with engines that are designed so as to be overdimensioned, proposals have already been made in the past for an aircraft with a twin-engined power plant having engines with different maximum powers. This applies to document WO 2012/059671 A2, which proposes two engines with different maximum powers.

Document US 2009/186320 describes an aircraft having three turboshaft engines that appear to be identical. The aircraft includes a system for simulating the failure of a turboshaft engine.

Likewise, document U.S. Pat. No. 3,002,710 describes an aircraft having at least three engines.

Document U.S. Pat. No. 4,177,693 describes a main gearbox MGB connected to three engines that appear to be identical.

Document EP 1 175 337 describes an additional mechanical control system for a rotorcraft.

Finally, document EP 2 148 066 is also known.

BRIEF SUMMARY OF THE INVENTION

An object of the present invention is thus to propose an aircraft having a novel configuration that seeks to optimize its power plant.

According to the invention, an aircraft is provided with a rotary wing and with three turboshaft engines for driving the rotary wing.

In addition, said three turboshaft engines include two main turboshaft engines that are identical and capable of operating at at least one specific rating associated with a main power that can be developed. The two main turboshaft engines can thus operate in a standard rating associated with a maximum continuous power MCP. In other words, each main turboshaft engine can develop the maximum continuous power MCP.

Said turboshaft engines also include a secondary turboshaft engine capable of operating at said at least one specific rating by delivering secondary power that is proportional to the corresponding main power, in application of a coefficient of proportionality that is less than or equal to 0.5.

The secondary turboshaft engine thus develops power that is no more than half the power developed by each of the main engines.

The aircraft therefore does not have three engines that are identical as in certain portions of the prior art, but rather it has two big "main turboshaft engines" that are identical and one little "secondary turboshaft engine", where the relative terms "big" and "little" refer specifically to the power levels that these turboshaft engines can develop.

The aircraft then possesses a control system for driving the rotary wing by causing each main turboshaft engine to operate continuously throughout a flight, and causing the secondary turboshaft engine to operate as a supplement during at least one predetermined specific stage of flight.

The term "specific stage of flight" designates periods during which the secondary turboshaft engine is used to contribute to the propulsion and/or the lift of the aircraft.

Consequently, the invention suggests using two identical turboshaft engines together with a secondary turboshaft engine that is capable of developing "secondary" power that is less than the "main" power that can be developed by each of the main engines at a given specific rating.

The use of a secondary turboshaft engine that is underdimensioned and of small size compared with the main turboshaft engines might appear to be surprising and counterproductive. It should be recalled that the greater the power of a turboshaft engine, the smaller its specific weight. Installing a small, low power turboshaft engine would thus appear to be an aberration in the light of that principle.

Nevertheless, the invention makes provision for using the secondary turboshaft engine only during specific stages of flight. Using a turboshaft engine that is expensive to run, but only for short and limited periods during the lifetime of an aircraft, then need not be a handicap in the face of the advantages of the invention.

Such an aircraft does not require a very powerful contingency specific rating to be implemented, such as the ratings associated with the 30" OEI supercontingency power rating and the 2' OEI maximum contingency power rating.

Under such circumstances, the main turboshaft engines may have a normal specific utilization rating, i.e. a takeoff rating associated with a maximum takeoff power maxTOP, and a standard rating accompanied with a maximum continuous power MCP.

The secondary turboshaft engine may have a normal specific rating associated with a secondary maximum takeoff power maxTOP'. The secondary maximum takeoff power maxTOP' is then equal to k times the main maximum takeoff power maxTOP, where "k" represents said coefficient of proportionality.

Consequently, the main turboshaft engines may be dimensioned as a function of their maximum continuous power. The specific consumption of the main turboshaft engines during cruising flight is then optimized, for example. Since this maximum continuous power is the power that is used for the most of the time during the lifetime of an aircraft, this optimization is advantageous.

Thus, by way of example, during cruising flight, only the main turboshaft engines are used for driving the propulsion and/or lift means.

Nevertheless, the failure of a main turboshaft engine is not catastrophic, since the other main engine can ensure continued flight given the power levels required for cruising flight.

In contrast, during each specific stage of flight that requires a high level of power, the control system makes use not only of the main turboshaft engines but also of the secondary turboshaft engine for driving the propulsion and/or lift means. In the event of a main turboshaft engine failing, the main turboshaft engine that remains in operation together with the secondary engine can still ensure safe flight.

Since these specific stages of flight are used relatively little, the non-optimum efficiency of the secondary turboshaft engine may be compensated, for example, by the savings achieved during cruising flight. Statistically speaking, specific stages of flight are used for about five minutes per hour of flight.

In addition, during each specific stage and in the absence of a failure, the secondary turboshaft engine may deliver additional power capable of improving the performance of the aircraft.

For this purpose, the aircraft may have an additional rotor for controlling yaw movement of the aircraft as well as a rotary wing.

Under such circumstances, the aircraft may have a main gearbox MGB driving the rotary wing and a tail gearbox driving the additional rotor. The main turboshaft engines may drive the main gearbox MGB with the main gearbox MGB driving the tail gearbox via a mechanical connection.

The secondary turboshaft engine may then mesh with said mechanical connection.

Thus, a large fraction of the power delivered by the secondary turboshaft engine during each specific stage of flight, and not including failures, is used by the additional rotor. Additional power is used by the rotary wing, possibly for improving the performance of the aircraft.

In other variants, the secondary turboshaft engine may be connected either to a mechanical connection going from a main engine to the main gearbox MGB, or else to the main gearbox MGB via a new mechanical connection.

By way of example, a twin-engined rotary wing aircraft may have two turboshaft engines, each developing maximum continuous power of about 1500 kilowatts (kW), and a supercontingency power of about 1800 kW.

In the event of an engine failing, the power plant can thus develop power of 1800 kW for a limit period of time.

By implementing the invention, it is possible to use two main turboshaft engines each developing a maximum continuous power of about 1500 kW, but not developing any supercontingency power, thus enabling their specific weight and their specific consumption to be optimized for use of the main maximum continuous power.

Adding a secondary turboshaft engine in accordance with the invention nevertheless makes it possible to increase the power that the power plant can deliver, e.g. in order to reach at least a total power of 1800 kW. The secondary turboshaft engine is also small in size and does not lead to an excessive increase in weight. It is also shown below that the increase in weight can, surprisingly, be small.

The aircraft may also include one or more of the following characteristics.

For example, said coefficient of proportionality may lie in the range 0.2 to 0.5.

The secondary turboshaft engine is a small engine that is under-dimensioned compared with the main turboshaft engine.

Returning to the example given above, a coefficient of proportionality equal to 0.2 enables the power plant to reach a total power of 1800 kW.

This range for the coefficient of proportionality is also limited. Furthermore, this range for the coefficient of proportionality presents particular advantages that do not stem from mere unimaginative exercise of technical skills, but that result from an inventive step.

The Applicant has found that when landing in autorotation with two main engines no longer delivering power, the use of a secondary engine presenting such a coefficient of proportionality makes it possible to reduce the rate of descent by a factor of not less than two compared with an aircraft not having such a secondary engine. Landing can then take place under conditions that are less unfavorable.

Furthermore, during each specific stage of flight, the control system may regulate the turboshaft engines to cause them to operate in application of a normal specific rating suitable for use in the absence of a failure of a turboshaft engine.

For example, in hovering flight, the turboshaft engines operate at their normal specific rating for takeoff.

No contingency rating then needs to be provided, unlike the prior art.

In another variant, during each specific stage of flight, the control system may regulate the three turboshaft engines to cause them to operate in application of specific ratings including a normal specific rating usable in the absence of a failure of a turboshaft engine, and a single contingency specific rating usable continuously in the event of a failure of a main turboshaft engine.

This variant provides using a single contingency specific rating, e.g. of the type corresponding to the third contingency specific rating in the prior art associated with the continuous contingency rating OEIcont. Such a rating does little or no damage, and gives rise to relatively little extra overpower compared with the maximum continuous power rating MCP, in particular.

Furthermore, each turboshaft engine has a gas generator and the aircraft may include a measurement system for measuring the speed of rotation Ng of each gas generator, the control system co-operating with the measurement system to regulate the secondary turboshaft engine during each specific stage of flight by regulating the speed of rotation of the gas generator of the secondary turboshaft engine as a function of the speed of rotation of the gas generator of a main turboshaft engine. More particularly, the control system may regulate the speed of rotation of the gas generator of the secondary turboshaft engine as a function of the higher of the speeds of rotation of the gas generators of the main turboshaft engines.

The control system may tend to induce speeds of rotation that are equal for the gas generators of the secondary turboshaft engine and of the main turboshaft engine that is being used as the reference.

During each specific stage of flight and in the event of a failure of a main turboshaft engine, the main turboshaft engine and the secondary turboshaft engine accelerate in order to compensate for the loss of power that results from the failure.

The acceleration of the secondary turboshaft engine is then very fast because of the small size of the secondary turboshaft engine compared with the dimensions of the main turboshaft engines. This fast acceleration saves seconds that are precious for the pilot.

Furthermore, in spite of the unequal powers delivered by the turboshaft engines, this regulation makes it possible to display similar control parameters to a pilot, namely the speeds of rotation of the gas generators of the turboshaft engines ought to be substantially equal. By way of example, the speeds of rotation of the gas turboshaft generators of the engines as presented to a pilot are expressed as percentages of the speed of rotation of the gas generators during the takeoff rating.

In addition, the aircraft may have a measurement device for measuring the forward speed of the aircraft, the control system co-operating with the measurement system to use the secondary turboshaft engine in order to drive the rotary wing when said forward speed is slower than a threshold.

Under such circumstances, said specific stages of flight comprise periods of flight at low speed. By way of example, the threshold may correspond to the minimum power speed needed for flight known as Vy, or to a percentage of this minimum power speed Vy.

Optionally, the aircraft includes retractable landing gear and a determination system for determining whether the landing gear is extended, and the control system co-operates with the determination system to use the secondary turboshaft engine to drive the rotary wing when the landing gear is extended.

Low-speed flight is sometimes performed with the landing gear extended. Under such circumstances, the secondary turboshaft engine may be used to participate in the propulsion and/or lift of an aircraft in this situation.

The aircraft may also include a determination device for determining whether the aircraft is on the ground, the control system co-operating with the determination device in order to use the secondary turboshaft engine to drive the rotary wing when the aircraft is on the ground.

The secondary turboshaft engine may optionally be used for moving the aircraft on a parking area.

In addition, the aircraft optionally does not have an auxiliary power unit for delivering electricity, the aircraft including an electricity generator system co-operating with the secondary turboshaft engine in order to generate electricity other than during each specific stage of flight, and a 17 amp-hour (Ah) battery suitable for starting the secondary turboshaft engine.

The impact of providing a secondary turboshaft engine in the meaning of the invention then becomes limited.

A twin-engined aircraft generally has an auxiliary power unit and powerful batteries capable of storing at least 45 Ah. Eliminating the auxiliary power unit and replacing its powerful batteries with smaller batteries enables a non-negligible saving of weight to be achieved. This saving may be about one kilogram per ampere-hour saved.

Under such circumstances, the secondary turboshaft engine can perform the function of an auxiliary power unit. The secondary turboshaft engine is then started on the ground using the 17 Ah battery. The secondary turboshaft engine allows the aircraft to taxi and it can generate sufficient electricity to be able to start the main engine.

Furthermore, outside any specific stage of flight, the secondary turboshaft engine may also operate in an auxiliary mode for generating electricity.

This operation may be advantageous in the event of a failure of the on-board electricity network, or for powering equipment that requires a large amount of electrical energy, such as de-icing equipment, for example.

To this end, said control system may include a disconnection system for disconnecting the secondary turboshaft engine in order to separate the secondary turboshaft engine from the rotary wing.

In the event of an electrical problem, the secondary turboshaft engine may be separated from the rotary wing drive train.

The electricity generation system may then comprise a starter-generator of the secondary turboshaft engine. Under such circumstances, operating the secondary turboshaft engine makes it possible to generate electricity via the starter-generator installed on the secondary turboshaft engine.

In the event of the 17 Ah battery failing, at least one alternator connected to a main turboshaft engine may be capable of delivering the electricity required for starting the secondary turboshaft engine, should that be necessary.

A conventional starter-generator is capable of delivering 200 amps (A) at 24 volts (V), and can therefore advantageously deliver the electricity needed, e.g. for powering de-icing equipment, or indeed for supplementing the alternators of the main turboshaft engines in the event of a failure of elements in the on-board electricity network (alternator, rectifier, . . . ). The electricity network may be similar to that constituting the subject matter of document FR 2 962 404.

The aircraft may also include warning means for informing a pilot that the secondary turboshaft engine needs to be put into operation. The aircraft is then provided with manual activation means.

The secondary turboshaft engine may also be put into operation automatically by the control system.

In particular, the control system may comprise one electronic regulator member per turboshaft engine of the kind known by the acronym FADEC, with these members possibly communicating with one another.

In addition to an aircraft, the invention provides a method of using a rotary wing aircraft of the above-described type.

In the method, three turboshaft engines are installed in the aircraft in order to drive said rotary wing, said three engines including two main turboshaft engines that are identical and capable of operating at at least one specific rating associated with a main power that can be developed, said three turboshaft engines also including a secondary turboshaft engine capable of operating at said at least one specific rating to deliver a secondary power proportional to the corresponding main power in application of a coefficient of proportionality less than or equal to 0.5.

Under such circumstances, the turboshaft engines are controlled to drive the rotary wing by causing each of the main turboshaft engines to operate continuously during a flight and by using the secondary turboshaft engine as a supplement during at least one predetermined specific stage of flight.

This method may include one or more of the following characteristics.

Thus, the secondary turboshaft engine may be dimensioned so that the coefficient of proportionality lies in the range 0.2 to 0.5.

In addition, each main turboshaft engine is capable of operating at a standard rating associated with a maximum continuous power and at a normal specific rating associated with a maximum takeoff power that is used during each specific stage of flight, the secondary turboshaft engine being capable of operating at a secondary maximum takeoff power at the normal specific rating, and, in one variant:

the main turboshaft engines are dimensioned as a function of the maximum continuous power in order to optimize the specific consumption of the main turboshaft engines at this maximum continuous power;

the maximum takeoff power is dimensioned as a function of the maximum continuous power in application of a proportionality relationship, this proportionality relationship being determined by the laws of thermodynamics and by the lifetime desired for the engine; and the secondary maximum takeoff power is dimensioned as a function of the maximum takeoff power by applying said coefficient of proportionality k.

In the prior art, a turboshaft engine is dimensioned as a function of its supercontingency power. This results in particular to specific consumption that is not optimized at maximum continuous power.

The invention goes against this prejudice by dimensioning the main turboshaft engines as a function of the maximum continuous power they are to deliver. The manufacturer can easily establish this maximum continuous power as a function of the performance required of the aircraft.

By using conventional relationships, the manufacturer then deduces the main maximum takeoff power. The main maximum takeoff power may for example be about 1.11 times the maximum continuous power.

Finally, the manufacturer dimensions the secondary turboshaft engine so that the secondary turboshaft engine can deliver secondary maximum takeoff power equal to k times the main maximum takeoff power maxTOP.

When the secondary turboshaft engine is used during each specific stage of flight, other than in the event of a failure, the turboshaft engines operate in application of their normal specific ratings.

Nevertheless, the extra power made available by the secondary turboshaft engine avoids any need for the main turboshaft engines to deliver the maximum takeoff power. The power delivered by the main turboshaft engines is then close to the maximum continuous power that was used for dimensioning those turboshaft engines.

Optionally, each main turboshaft engine is capable of operating at a contingency specific rating associated with a single main contingency power during each specific stage in the event of a failure of the other main engine, the secondary turboshaft engine being capable of operating at the contingency specific rating at a secondary maximum contingency power, and:

the main contingency power is dimensioned as a function of the maximum continuous power in application of a proportionality rule; and the secondary contingency power is dimensioned as a function of the main contingency power by applying said coefficient of proportionality.

The main contingency power may for example be about 1.025 times the main maximum takeoff power maxTOP.

Under such conditions, the secondary turboshaft engine may be regulated during each specific stage of flight by regulating the speed of rotation of the gas generator of the secondary turboshaft engine as a function of the speed of rotation of the gas generator of a main turboshaft engine, possibly as a function of the faster of the speeds of rotation of the gas generators.

Furthermore, the speed of rotation of the gas generator of the secondary turboshaft engine may be regulated to tend towards the speed of rotation of the gas generator of a main turboshaft engine.

For example, the speed of rotation of the gas generator of the secondary turboshaft engine is regulated:

on a priority basis, as a function of the speed of rotation of the gas generator of the main turboshaft engine that is developing the faster speed of rotation for its gas generator; and in the event of the main turboshaft engine that is developing the faster speed of rotation of its gas generator, as a function of the speed of rotation of the gas generator of the turboshaft engine remaining in operation.

In addition, the speed of rotation of the gas generator of the secondary turboshaft engine may be regulated as a function of the speed of rotation of the rotary wing in the event of a failure of both main engines.

Furthermore, the secondary turboshaft engine may be used to drive the rotary wing in at least one of the following situations:

when said forward speed of the aircraft is slower than a threshold;

when said aircraft includes retractable landing gear, the secondary turboshaft engine is used in order to drive the rotary wing when the landing gear is extended; and when the aircraft is on the ground.

The secondary turboshaft engine may thus be used only in the presence of one of these situations, while the main turboshaft engines are used continuously throughout a flight. Outside these situations, the secondary turboshaft engine may be stopped, caused to idle, or indeed disconnected from the drive mechanism of the rotary wing.

In one method, on starting the aircraft, it is the secondary turboshaft engine that is started first. The secondary turboshaft engine can drive accessories, e.g. for preheating lubricating oils or indeed a cabin.

The rotor brake of the aircraft is then released to allow the rotary wing to be driven using the secondary turboshaft engine. The aircraft may then optionally taxi on the ground.

Thereafter, the main turboshaft engines are started. On takeoff, all three turboshaft engines operate at the normal specific rating associated with maximum takeoff power. The three turboshaft engines deliver power proportional to their maximum takeoff powers, all at the same ratio.

A failure of the secondary turboshaft engine constitutes a non-event in the sense that the main turboshaft engines suffice for ensuring takeoff.

In the event of a failure of a main turboshaft engine, the remaining turboshaft engines can accelerate in order to compensate for the resulting loss of power. The pilot may possibly concentrate on managing flight path, while the control system acts automatically to control the turboshaft engines.

In cruising flight, the secondary turboshaft engine is not necessary for ensuring flight. The secondary turboshaft engine may then be stopped, or it may be caused to idle, or it may be separated from the mechanism for driving the rotary wing. When the secondary turboshaft engine is separated from the rotary wing, the secondary turboshaft engine may be used in an APU mode of operation.

In order to provide pilot training in handling a failure of a main turboshaft engine, the control system may cause one of the main turboshaft engines to idle while making use of the secondary turboshaft engine.

BRIEF DESCRIPTION OF THE SEVERAL VIEWS OF THE DRAWINGS

The invention and its advantages appear in greater detail from the following description of embodiments given by way of illustration and with reference to the accompanying figures, in which.

Elements that are present in more than one of the figures are given the same references in each of them.

DETAILED DESCRIPTION OF THE INVENTION

Figure 1:
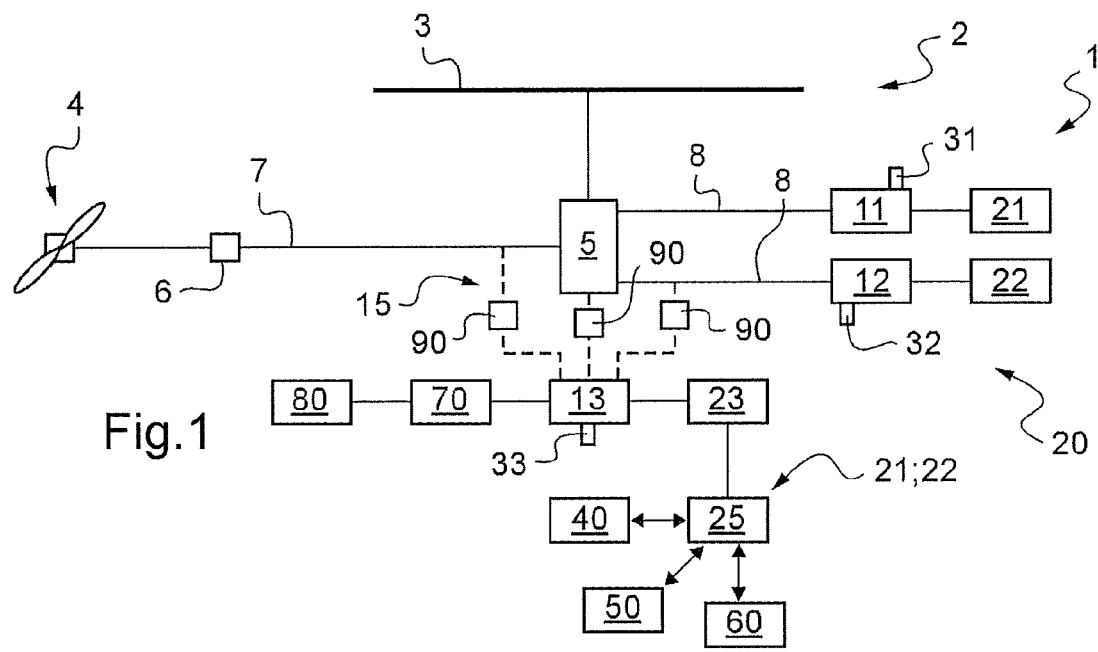
FIG. 1 shows an aircraft of the invention.

FIG. 1 shows an aircraft 1 in diagrammatic manner for the purpose of illustrating the invention.

The aircraft 1 may have a rotary wing 2 comprising at least one rotor 3 for providing lift and possibly also propulsion. In addition, the aircraft may include at least one additional rotor 4 in particular for controlling yaw movement of the aircraft.

Consequently, the aircraft 1 has a main gearbox "MGB" 5 for driving the rotary wing 2 in rotation, and a secondary gearbox 6 for driving the additional rotor 4 in rotation. A power transmission train 7 connects the main gearbox MGB 5 to the secondary gearbox 6.

In addition, the aircraft has three turboshaft engines 11, 12, and 13 capable of setting the rotary wing 2 and the additional rotor 4 into rotation via the main and secondary gearboxes 5 and 6.

More precisely, the aircraft 1 is provided in particular with two main turboshaft engines 11 and 12. These two main turboshaft engines 11 and 12 may be connected to the main gearbox MGB 5 via conventional mechanical connections 8.

These two main turboshaft engines 11 and 12 are identical. The manufacturer may design these main turboshaft engines for two operating ratings, namely a standard rating associated with maximum continuous power MCP and a normal specific rating associated with a maximum power referred to as "maximum takeoff power" maxTOP.

Furthermore, the manufacturer may provide for a single specific contingency specific rating for the operation of the main turboshaft engines that is associated with a main contingency power OEIcont.

The standard rating is used during cruising flight, while the specific ratings are used during predetermined specific stages of flight.

The aircraft also has a third turboshaft engine referred to as the "secondary" turboshaft engine 13. This secondary turboshaft engine may be situated on the opposite side of the main gearbox MGB 5 relative to the main turboshaft engines in order to improve the general balance of the aircraft. For example, in FIG. 1, the main turboshaft engines 11 and 12 may be arranged on the right of the main gearbox MGB 5, while the secondary turboshaft engine 13 is arranged to the left of the main gearbox MGB 5.

The secondary turboshaft engine is then connected by a mechanical power transmission system 15, either to a mechanical connection 8, or to the main gearbox MGB 5, or to the power transmission train 7.

The mechanical power transmission system 15, the mechanical connection 8, and the power transmission train 7 are commonly referred to as the "power transmission drive train" by the person skilled in the art. Nevertheless, a variety of expressions are in use in order to avoid any confusion between the various trains.

It can be understood that as a function of speed of rotation, speed-reducing gearboxes for reducing speed of rotation may be arranged on the aircraft.

For example, when the secondary engine is connected by the mechanical power transmission system 15 to the power transmission train 7, a speed reducing gearbox may be arranged in the power transmission train 7.

In addition, the mechanical power transmission system 15 may include a disconnection system 90 in particular for separating the secondary turboshaft engine 13 from the rotary wing 2. The disconnection system serves to separate the secondary turboshaft engine 13 in the event of overspeed, or under certain circumstances described below.

The disconnection system 90 may include an over-running clutch or "freewheel" that can be inhibited, and that is sometimes referred to as a "releasable freewheel", an ordinary clutch, or indeed an electronic freewheel.

Figure 2:
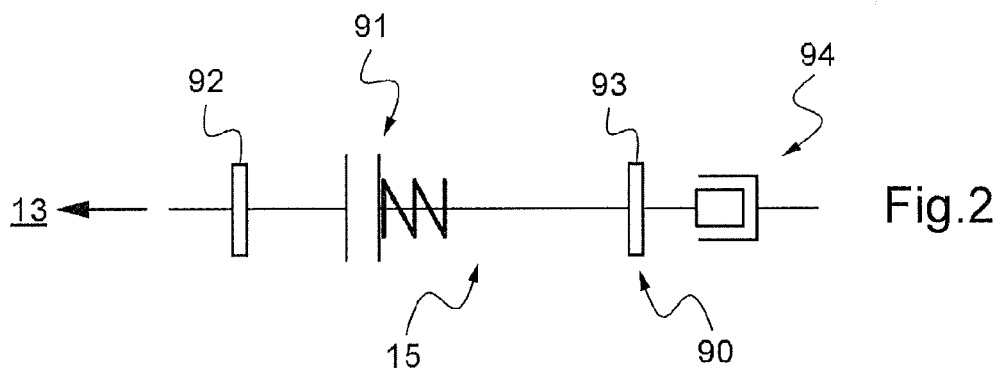
FIG. 2 shows a disconnection system.

In FIG. 2, such an electronic freewheel includes a conventional clutch 91. Since the speed of rotation of the mechanical transmission system 15 is high, the clutch 91 may be of reasonable dimensions.

The electronic freewheel thus includes a first phonic wheel 92 and a second phonic wheel 93 arranged on either side of the clutch 91.

More precisely, the first phonic wheel 92 is interposed between the clutch 91 and the secondary turboshaft engine 13. The second phonic wheel 93 is arranged between the clutch 91 and a conventional freewheel 94.

The phonic wheels measure the speeds of rotation of the mechanical portions situated upstream and downstream from the clutch. Under such circumstances, the clutch is engaged only during situations specified by the manufacturer, and when said speeds of rotation enable power to be transmitted without slip.

The electronic freewheel may also comprise a conventional additional shaft, e.g. arranged between the clutch 91 and a phonic wheel.

Thus, in normal mode, both phonic wheels measure the same speed of rotation. The additional shaft then makes it possible to detect a sign reversal in the torque transmitted through the electronic freewheel.

Under such circumstances, the clutch is open when the drive train is tending to drive rotation of the secondary turboshaft engine.

With reference to FIG. 1, the secondary turboshaft engine is designed to operate in order to supplement the main turboshaft engines while performing specific ratings.

When performing a specific rating, the secondary turboshaft engine 13 delivers secondary power maxTOP', OEIcont' proportional to the corresponding main power maxTOP, OEIcont from the main turboshaft engines 11, 12, with a coefficient of proportionality k that is less than or equal to 0.5.

This coefficient of proportionality k may possibly lie in the range 0.2 to 0.5.

Under such circumstances, the manufacturer may provide for the secondary turboshaft engine to operate at a normal specific rating associated with a maximum takeoff secondary power maxTOP' equal to k times the maximum takeoff power maxTOP, and possibly a contingency specific rating associated with a secondary contingency rating OEIcont' equal to k times the main contingency rating OEIcont.

Consequently, the aircraft has a control system 20 for controlling the turboshaft engines. The control system 20 may comprise one electronic regulator member 21, 22, 23 per turboshaft engine, such as a full authority digital engine control (FADEC).

In order to provide the aircraft with lift and possibly also propulsion, the control system 20 makes use of each of the main turboshaft engines 11 and 12 continuously throughout a flight, and supplements them with the secondary turboshaft engine 13, at least during a predetermined specific stage of flight.

For this purpose, the electronic regulator members may communicate with one another and with elements for determining whether or not the aircraft is in a specific stage of flight.

In a variant, the control system may include a processor unit 25 communicating with the electronic regulator members and with the elements for determining whether the aircraft is flying in a specific stage.

For example, the aircraft may have at least the following elements:

a conventional measurement device 40 for measuring the forward speed of the aircraft, said control system communicating with this measurement system;

a determination system 50 for determining whether retractable landing gear is extended, the control system communicating with this determination system; and a determination device 60 for determining whether the aircraft is standing on the ground, the control system communicating with the determination device.

Thus, depending on the variant, the secondary turboshaft engine is used in order to drive the rotary wing in at least one of the following specific stages of flight:

when the forward speed of the aircraft is slower than a threshold;

for an aircraft that has retractable landing gear, when the landing gear is extended; and when the aircraft is standing on the ground.

Consequently, outside the specific stages, the secondary turboshaft engine is not used for driving the rotary wing. The secondary turboshaft engine may be stopped, or idling, or indeed it may be disconnected via the disconnection system 90.

The main turboshaft engines then operate at their standard rating.

In contrast, during the specific stages, the main turboshaft engines and the secondary turboshaft engine are used at the same specific rating.

More precisely, the main and secondary turboshaft engines are used to operate at the normal specific rating.

In the event of a failure, if the main turboshaft engine that remains in operation accelerates in order to reach its maximum takeoff power or indeed its main contingency power, the secondary turboshaft engine accelerates in parallel in order to reach respectively the secondary maximum takeoff power or the secondary contingency power. The way the secondary engine is regulated is simple and does not lead to any additional workload on the pilot.

In the absence of a failure of a main turboshaft engine, the control system 20 regulates the turboshaft engines so as to cause them to operate in the normal specific rating.

Where applicable, and in the presence of a failure of a main turboshaft engine, the control system 20 regulates the turboshaft engines that remain in operation so as to cause them to operate at the contingency specific rating.

In order to regulate the turboshaft engines, given that each turboshaft engine 11, 12, 13 has a gas generator, the aircraft 1 is provided with a measurement system for measuring the speed of rotation Ng of each gas generator. This measurement system may comprise conventional measurement instruments 31, 32, 33 arranged on the three engines.

The control system 20 then communicates with the measurement system during each specific stage in order to regulate the speed of rotation of the gas generator of the secondary turboshaft engine as a function of the speed of rotation of the gas generator of a main turboshaft engine 11, 12.

Thus, it is possible to regulate the speed of rotation of the gas generator of the secondary turboshaft engine in order to cause it to tend towards the speed of rotation of the gas generator of a main engine.

The main turboshaft engines are regulated using the conventional technique, e.g. as a function of a setpoint for the speed of rotation of the rotary wing. In contrast, the secondary turboshaft engine is regulated to cause its gas generator to reach a speed of rotation that is equal to the speed of rotation of the gas generator of a main engine.

In particular, the speed of rotation of the gas generator of the secondary turboshaft engine is regulated on a priority basis as a function of the speed of rotation of the gas generator of the faster of the main turboshaft engines.

In the event of this engine failing, regulation is performed as a function of the speed of rotation of the gas generator of the main turboshaft engine that remains in operation.

In addition, the speed of rotation of the gas generator of the secondary turboshaft engine can be regulated as a function of the speed of rotation of the rotary wing in the event of failure of both of the main turboshaft engines.

It should be observed that the failure of an turboshaft engine may be detected by a regulator member using the usual techniques.

Furthermore, the aircraft 1 need not have an auxiliary power unit (APU) for delivering electricity. The aircraft 1 may then have an electricity generator system 70 meshing with a movable member of the secondary turboshaft engine in order to generate electricity or in order to start the secondary engine. This electricity generator system 70 may also communicate with a 17 amp-hour battery 80, suitable for starting the secondary turboshaft engine.

Figure 3:
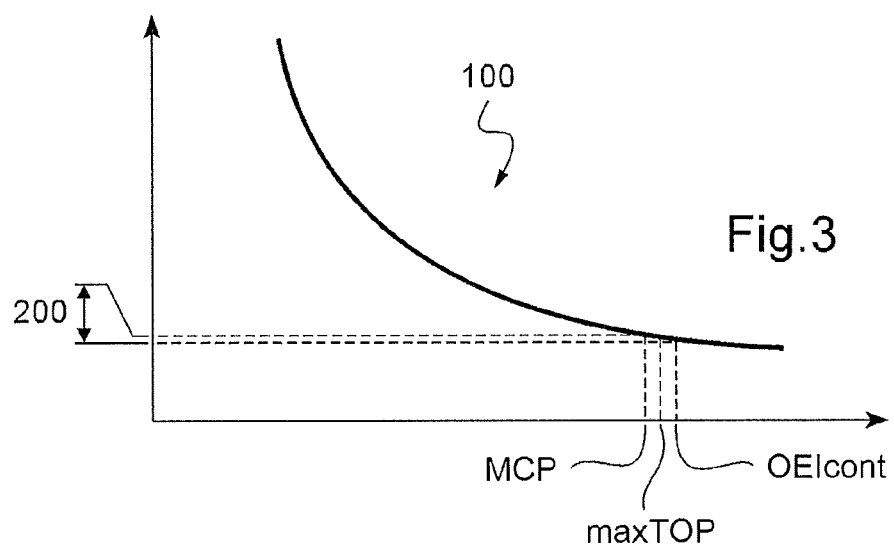
FIG. 3 is a diagram showing the specific consumption of a turboshaft engine.

With reference to FIG. 3, a curve 100 represents the specific consumption of a turboshaft engine; this curve si shown on a graph plotting the power developed by the turboshaft engine along the abscissa and plotting specific consumption up the ordinate, and it can be seen that specific consumption decreases with increasing developed power.

The invention thus makes it possible to dimension the main turboshaft engines in a novel manner.

By eliminating the contingency rating that requires high powers, a manufacturer can dimension the main turboshaft engines 11 and 12 as a function of the maximum continuous power MCP that is to be delivered.

Under such circumstances, the manufacturer may deduce therefrom the maximum takeoff power maxTOP for the main engines, and possibly also the main contingency power OEIcont using conventional rules.

It is then found that these three powers are close together and give rise to a change 200 in specific consumption that is minimized compared with the state of the art.

Under such circumstances, the manufacturer dimensions the secondary turboshaft engine by determining the secondary maximum takeoff power maxTOP', and where appropriate the secondary contingency power OEIcont', by applying the selected coefficient of proportionality k.

Naturally, the present invention may be subjected to numerous variations concerning its embodiment. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. An aircraft comprising:
   a rotary wing;
   three turboshaft engines for driving the rotary wing;
   wherein the three turboshaft engines include two main turboshaft engines that are identical in powerfulness, each main turboshaft engine being operable at at least one specific rating that is associated with a maximum main power (maxTOP, OEIcont);
   wherein the three turboshaft engines also include a secondary turboshaft engine that is less powerful than each of the main turboshaft engines, the secondary turboshaft engine being operable in the at least one specific rating that is further associated with a maximum secondary power (maxTOP', OEIcont'), wherein the maximum secondary power is proportional to the maximum main power with a coefficient of proportionality (k) that lies within a range of 0.2 to 0.5; and a control system for driving the rotary wing by causing each main turboshaft engine to operate continuously throughout a flight for each of the main turboshaft engines to respectively deliver a main power less than the maximum main power and by causing the secondary turboshaft engine to operate as a supplement during at least one predetermined specific stage of flight for the secondary turboshaft engine to deliver a secondary power in proportion, according to the coefficient of proportionality, to the main power respectively delivered by the main turboshaft engines such that the secondary power developed by the secondary turboshaft engine is equal to the main power developed respectively by each of the main turboshaft engines multiplied by the coefficient of proportionality, the secondary power delivered by the secondary engine being in proportion, according to the coefficient of proportionality (k), to the main power respectively delivered by the main turboshaft engines even while the main power respectively delivered by the main engines varies.

2. The aircraft according to claim 1, wherein:
during each specific stage of flight, the control system regulates the turboshaft engines to cause them to operate at a normal specific rating (maxTOP, maxTOP') usable absent failure of one of the turboshaft engines.

3. The aircraft according to claim 1, wherein:
during each specific stage of flight, the control system regulates the three turboshaft engines to cause them to operate at specific ratings including a normal specific rating (maxTOP, maxTOP') usable absent failure of one of the turboshaft engines, and a single contingency specific rating (OEIcont, OEIcont') usable continuously in the event of a failure of one of the main turboshaft engines.

4. The aircraft according to claim 1, wherein:
each turboshaft engine has a gas generator;
the aircraft further includes a measurement system for measuring a speed of rotation Ng of each gas generator; and
the control system co-operating with the measurement system to regulate the secondary turboshaft engine during each specific stage of flight by regulating the speed of rotation of the gas generator of the secondary turboshaft engine as a function of the speed of rotation of the gas generator of one of the main turboshaft engines.

5. The aircraft according to claim 1, further comprising:
a measurement device for measuring a forward speed of the aircraft; and
the control system co-operating with the measurement device to use the secondary turboshaft engine in order to drive the rotary wing when the forward speed is slower than a threshold.

6. The aircraft according to claim 1, further comprising:
retractable landing gear;
a determination system for determining whether the landing gear is extended; and
the control system co-operates with the determination system to use the secondary turboshaft engine to drive the rotary wing when the landing gear is extended.

7. The aircraft according to claim 1, further comprising:
a determination device for determining whether the aircraft is on the ground; and
the control system co-operating with the determination device in order to use the secondary turboshaft engine to drive the rotary wing when the aircraft is on the ground.

8. The aircraft according to claim 1, wherein:
the aircraft does not have an auxiliary power unit for delivering electricity; and
the aircraft further including an electricity generator system co-operating with the secondary turboshaft engine in order to generate electricity other than during each specific stage of flight, and the aircraft further including a battery for starting the secondary turboshaft engine;
the control system includes a disconnection system for disconnecting the secondary turboshaft engine in order to separate the secondary turboshaft engine from the rotary wing and the control system is configured to operate the secondary turboshaft engine in an auxiliary mode for delivering electricity after the secondary turboshaft engine has been separated from the rotary wing.

9. A method of using a rotary wing aircraft having three turboshaft engines installed in the aircraft in order to drive the rotary wing, the three turboshaft engines including two main turboshaft engines that are identical in powerfulness, each main turboshaft engine being operable at at least one specific rating associated with a maximum main power (maxTOP, OEIcont), the three turboshaft engines also including a secondary turboshaft engine that is less powerful than each of the main turboshaft engines, the secondary turboshaft engine being operable at the at least one specific rating further associated with a secondary maximum power (maxTOP', OEIcont'), the maximum secondary power being proportional to the maximum main power in application of a coefficient of proportionality (k) that lies within a range of 0.2 to 0.5, the method comprising:
controlling the turboshaft engines to drive the rotary wing by causing each of the main turboshaft engines to operate continuously during a flight for each of the main turboshaft engines to respectively deliver a main power less than the maximum main power and by using the secondary turboshaft engine as a supplement during at least one predetermined specific stage of flight for the secondary turboshaft engine to deliver a secondary power in proportion, according to the coefficient of proportionality, to the main power respectively delivered by the main turboshaft engines such that the secondary power developed by the secondary turboshaft engine is equal to the main power developed respectively by each of the main turboshaft engines multiplied by the coefficient of proportionality, the secondary power delivered by the secondary engine being in proportion, according to the coefficient of proportionality (k), to the main power respectively delivered by the main turboshaft engines even while the main power respectively delivered by the main engines varies.

10. The method according to claim 9, wherein:
each main turboshaft engine is operable in application of a standard rating associated with a maximum continuous power (MCP) and a normal specific rating associated with a maximum takeoff power (maxTOP) that is used during each specific stage of flight, the secondary turboshaft engine is operable in application of a secondary maximum takeoff power (maxTOP') at the normal specific rating;
the main turboshaft engines are dimensioned as a function of the maximum continuous power (MCP) in order to optimize specific consumption of the main turboshaft engines at the maximum continuous power (MCP);

the maximum takeoff power (maxTOP) is dimensioned as a function of the maximum continuous power (MCP) in application of a proportionality relationship; and the secondary maximum takeoff power (maxTOP') is dimensioned as a function of the maximum takeoff power (maxTOP) by applying the coefficient of proportionality (k).

11. The method according to claim 10, wherein:

each main turboshaft engine is operable in application of a contingency specific rating associated with a single main contingency power (OEIcont) during each specific stage in the event of a failure of the other main turboshaft engine, the secondary turboshaft engine is operable in application of the contingency specific rating at a secondary contingency power (OEIcont');

the main contingency power (OEIcont) is dimensioned as a function of the maximum continuous power (MCP) in application of a proportionality rule; and the secondary contingency power (OEIcont') is dimensioned as a function of the main contingency power by applying the coefficient of proportionality.

12. The method according to claim 9, further comprising:

regulating the secondary engine during each specific stage of flight by regulating a speed of rotation of the gas generator of the secondary turboshaft engine as a function of a speed of rotation of the gas generator of a main turboshaft engine;

wherein the speed of rotation of the gas generator of the secondary turboshaft engine is regulated to tend towards the speed of rotation of the gas generator of a main turboshaft engine.

13. The method according to claim 9, further comprising:

regulating the speed of rotation of the gas generator of the secondary turboshaft engine:

on a priority basis, as a function of the speed of rotation of the gas generator of the main turboshaft engine that is developing the faster speed of rotation for the gas generator;

and in the event of the main turboshaft engine that is developing the fastest speed of rotation of its gas generator, as a function of the speed of rotation of the gas generator of the turboshaft engine remaining in operation.

14. The method according to claim 13, wherein:

the speed of rotation of the gas generator of the secondary turboshaft engine is regulated as a function of the speed of rotation of the rotary wing in the event of a failure of both main turboshaft engines.

15. The method according to claim 9, further comprising:

using the secondary turboshaft engine to drive the rotary wing in at least one of the following specific stages of flight:

when the forward speed of the aircraft is slower than a threshold;

when the aircraft includes retractable landing gear, the secondary engine is used in order to drive the rotary wing when the landing gear is extended; and when the aircraft is on the ground.

16. An aircraft comprising:

a rotary wing;

three turboshaft engines for driving the rotary wing, the three turboshaft engines including two main turboshaft engines that are identical in powerfulness and a secondary turboshaft engine that is less powerful than each of the main turboshaft engines, each main turboshaft engine being operable to respectively develop a main power up to a maximum main power and the secondary turboshaft engine being operable to develop a secondary power up to a maximum secondary power, the maximum secondary power being proportional to the maximum main power according to a coefficient of proportionality (k) that lies within a range of 0.2 to 0.5; and a control system for driving the rotary wing by causing the main turboshaft engines to operate continuously throughout a flight for each of the main turboshaft engines to respectively deliver a main power less than the maximum main power and by causing the secondary turboshaft engine to operate as a supplement during a predetermined specific stage of flight for the secondary turboshaft engine to deliver a secondary power in proportion, according to the coefficient of proportionality (k), to the main power respectively delivered by the main turboshaft engines, the secondary power delivered by the secondary engine being in proportion, according to the coefficient of proportionality (k), to the main power respectively delivered by the main turboshaft engines even while the main power respectively delivered by the main engines varies.

17. The aircraft according to claim 16, wherein:

the aircraft does not have an auxiliary power unit for delivering electricity; and the control system includes a disconnection system for disconnecting the secondary turboshaft engine in order to separate the secondary turboshaft engine from the rotary wing and the control system is configured to operate the secondary turboshaft engine in an auxiliary mode for delivering electricity after the secondary turboshaft engine has been separated from the rotary wing.

18. The method according to claim 9 wherein the aircraft does not have an auxiliary power unit for delivering electricity and the aircraft further includes (i) an electricity generator system co-operating with the secondary turboshaft engine in order to generate electricity other than during each specific stage of flight and (ii) a battery for starting the secondary turboshaft engine, the method further comprising:

controlling the secondary turboshaft engine to disconnect the secondary turboshaft engine in order to separate the secondary turboshaft engine from the rotary wing and operating the secondary turboshaft engine in an auxiliary mode for delivering electricity after the secondary turboshaft engine has been separated from the rotary wing.

* * * * *